United States Patent
Wu et al.

(10) Patent No.: US 8,550,795 B2
(45) Date of Patent: *Oct. 8, 2013

(54) SERIES-CONNECTED MOTOR UNIT AND A FAN UTILIZING THE SAME

(75) Inventors: Zhe-Hao Wu, Kaohsiung (TW); Cheng-Te Liu, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 301 days.

This patent is subject to a terminal disclaimer.

(21) Appl. No.: 13/006,516

(22) Filed: Jan. 14, 2011

(65) Prior Publication Data

US 2012/0134856 A1    May 31, 2012

(30) Foreign Application Priority Data

Nov. 29, 2010   (TW) .............................. 99141242 A

(51) Int. Cl.
*F04B 35/04*    (2006.01)

(52) U.S. Cl.
USPC .................................................. 417/423.14

(58) Field of Classification Search
USPC ........ 417/423.14, 423.5, 426, 423.7, 2, 5, 17, 417/363; 415/68; 310/67 R, 68 R, 112, 113, 310/114

See application file for complete search history.

(56) References Cited

U.S. PATENT DOCUMENTS

| | | | |
|---|---|---|---|
| 6,175,171 B1 * | 1/2001 | Rupp et al. | 310/52 |
| 6,904,960 B1 * | 6/2005 | Su et al. | 165/122 |
| 7,781,926 B2 | 8/2010 | Schmidt et al. | |
| 7,872,381 B2 * | 1/2011 | Watanabe et al. | 310/58 |
| 2008/0260517 A1 * | 10/2008 | Hayashigaito et al. | 415/68 |
| 2012/0039729 A1 * | 2/2012 | Horng et al. | 417/410.1 |
| 2012/0171057 A1 * | 7/2012 | Wu et al. | 417/354 |

FOREIGN PATENT DOCUMENTS

| | | | |
|---|---|---|---|
| CN | 101117969 | | 2/2008 |
| CN | 101117969 A | * | 2/2008 |
| CN | 101247708 | | 8/2008 |
| EP | 1731339 A1 | * | 12/2006 |
| TW | I322655 | | 8/2008 |

\* cited by examiner

*Primary Examiner* — Devon Kramer
*Assistant Examiner* — Amene Bayou
(74) *Attorney, Agent, or Firm* — Alan Kamrath; Kamrath IP Lawfirm, P.A.

(57) ABSTRACT

A series-connected motor unit includes a first motor, a second motor and a separation member. The first motor has a first circuit board, and the second motor has a second circuit board. The separation member has a first face and a second face opposite to the first face. The first face abuts against the first circuit board, and the second face abuts against the second circuit board.

14 Claims, 7 Drawing Sheets

SERIES-CONNECTED MOTOR UNIT AND A FAN UTILIZING THE SAME

BACKGROUND OF THE INVENTION

1. Field of the Invention

The present invention generally relates to a series-connected motor unit and a fan utilizing the series-connected motor unit and, more particularly, to a series-connected motor unit that provides a better vibration-proof effect by preventing the motor vibration from traveling between motors of the series-connected motor unit, and a fan utilizing the series-connected motor unit.

2. Description of the Related Art

Taiwanese Patent Number I322655 entitled "Circuit Board Holder, Dual Motor Apparatus and Dual Fan Structure" discloses a conventional series-connected motor unit as shown in FIG. 1. The series-connected motor unit includes two cooling fans 8 and a circuit board holder 9. Both the cooling fans 8 have a motor 81, a circuit board 82 and a plurality of vanes 83. The circuit board 82 can start operation of the motor 81 which, in turn, drives the vanes 83 to rotate. The circuit board holder 9 is disposed between the two cooling fans 8. The circuit board holder 9 consists of a plate 91 and a plurality of supporting members 92. The plate 91 has two faces 911 opposite to each other. The supporting members 92 are disposed on the plate 91 and protrude from the two faces 911. In this arrangement, the supporting members 92 are sandwiched between and abutted by the two circuit boards 82 when the two cooling fans 8 are assembled in series.

Since the circuit board holder 9 is disposed between the two cooling fans 8, a distance D is present between the two circuit boards 82. However, since the circuit board holder 9 abuts against the two circuit boards 82 only through the supporting members 92, the contact areas between the supporting members 92 and the two circuit boards 82 are very small. Thus, the supporting members 92 can only support and position the two circuit boards 82 in proper positions rather than prevent or relieve the motor vibration that travels between the two circuit boards 82. As a result, the motor vibration generated during operation of the two motors 81 will travel between the two motors 81. This not only affects the operation of the two cooling fans 8 but also shortens the service life of the two motors 81.

Furthermore, manufacturing of the circuit board holder 9 requires high sophistication. Specifically, the height H of the supporting members 92 protruding from the two faces 911 should be controlled in high accuracy in order to position the two circuit boards 82 in proper positions. Specifically, if the height H is too small, gaps may be present between the circuit board holder 9 and the two circuit boards 82, leading to loosening between the circuit board holder 9 and the two circuit boards 82. On the contrary, if the height H is too large, the circuit board holder 9 may over-press the two circuit boards 82, leading to damage of the two circuit boards 82.

SUMMARY OF THE INVENTION

It is therefore the primary objective of this invention to provide a series-connected motor unit and a fan utilizing the series-connected motor unit, in which the motor vibration is prevented from traveling between motors of the series-connected motor unit for a better vibration-proof effect.

It is another objective of this invention to provide a series-connected motor unit and a fan utilizing the series-connected motor unit, with the series-connected motor unit including a separation member which does not require high sophistication during the manufacturing process thereof, thereby enabling an easy manufacturing.

The invention discloses a series-connected motor unit including a first motor, a second motor and a separation member. The first motor has a first circuit board,, and the second motor has a second circuit board. The separation member has a first face and a second face opposite to the first face. The first face abuts against the first circuit board, and the second face abuts against the second circuit board.

Furthermore, the invention discloses a fan having a series-connected motor unit, which includes two frames, a series-connected motor unit and two rotation members. Each frame has an airway. The series-connected motor unit has a first motor, a second motor and a separation member. The first and second motors are respectively disposed in the two airways of the two frames. The first motor has a first circuit board, and the second motor has a second circuit board. The separation member has a first face and a second face opposite to the first face. The first face abuts against the first circuit board, and the second face abuts against the second circuit board. The two rotation members are respectively disposed in the two airways of the two frames. The first and second motors drive the two rotation members to rotate, respectively. Each of the two rotation members has a plurality of vanes on an outer circumferential face thereof.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
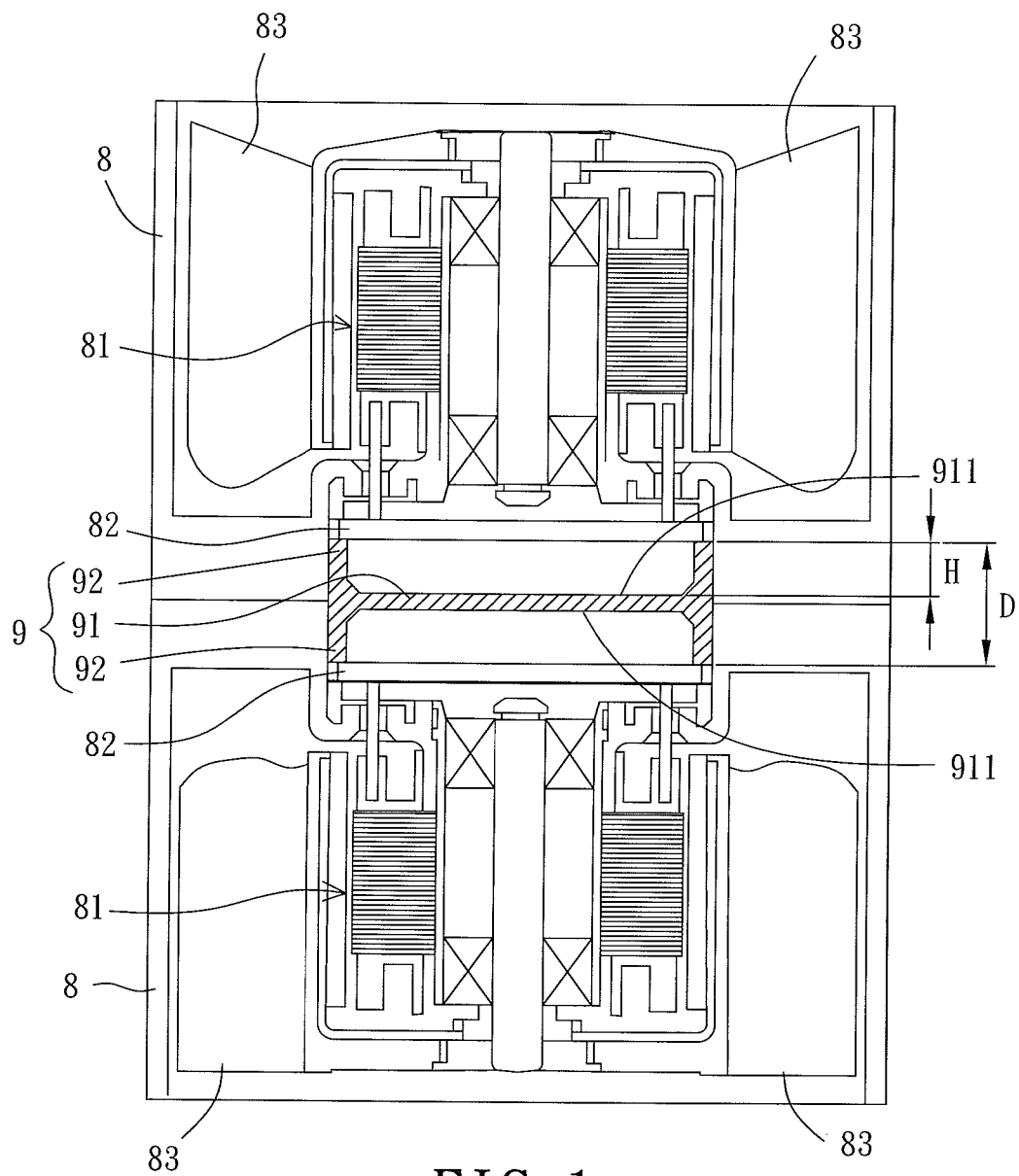
FIG. 1 shows a conventional series-connected motor unit disclosed by Taiwanese Patent Number I322655 entitled "Circuit Board Holder, Dual Motor Apparatus and Dual Fan Structure".

In the various figures of the drawings, the same numerals designate the same or similar parts. Furthermore, when the term "first", "second", "third", "fourth", "inner", "outer", "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
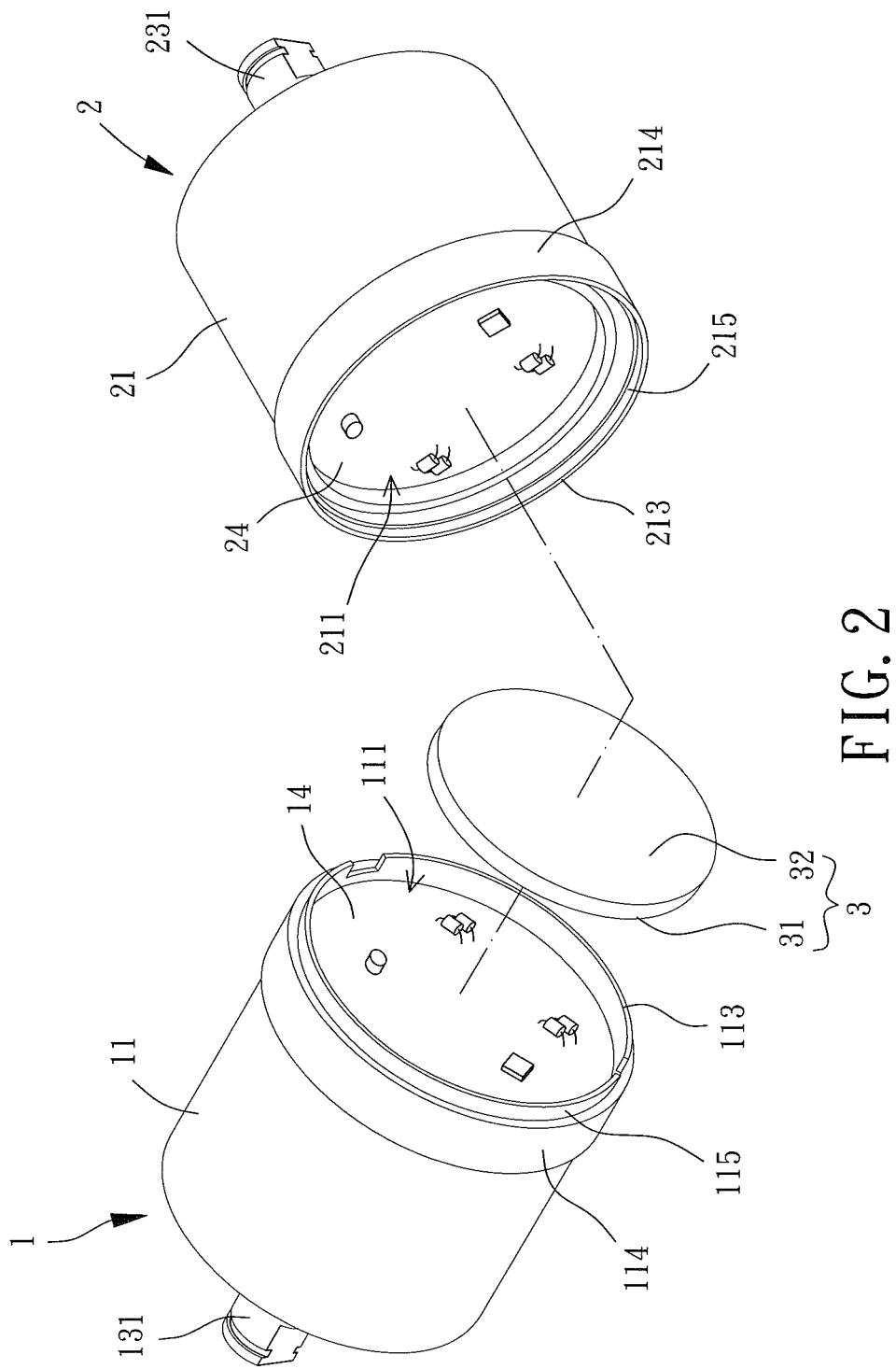
FIG. 2 shows an exploded diagram of a series-connected motor unit according to a first embodiment of the invention.
Figure 3:
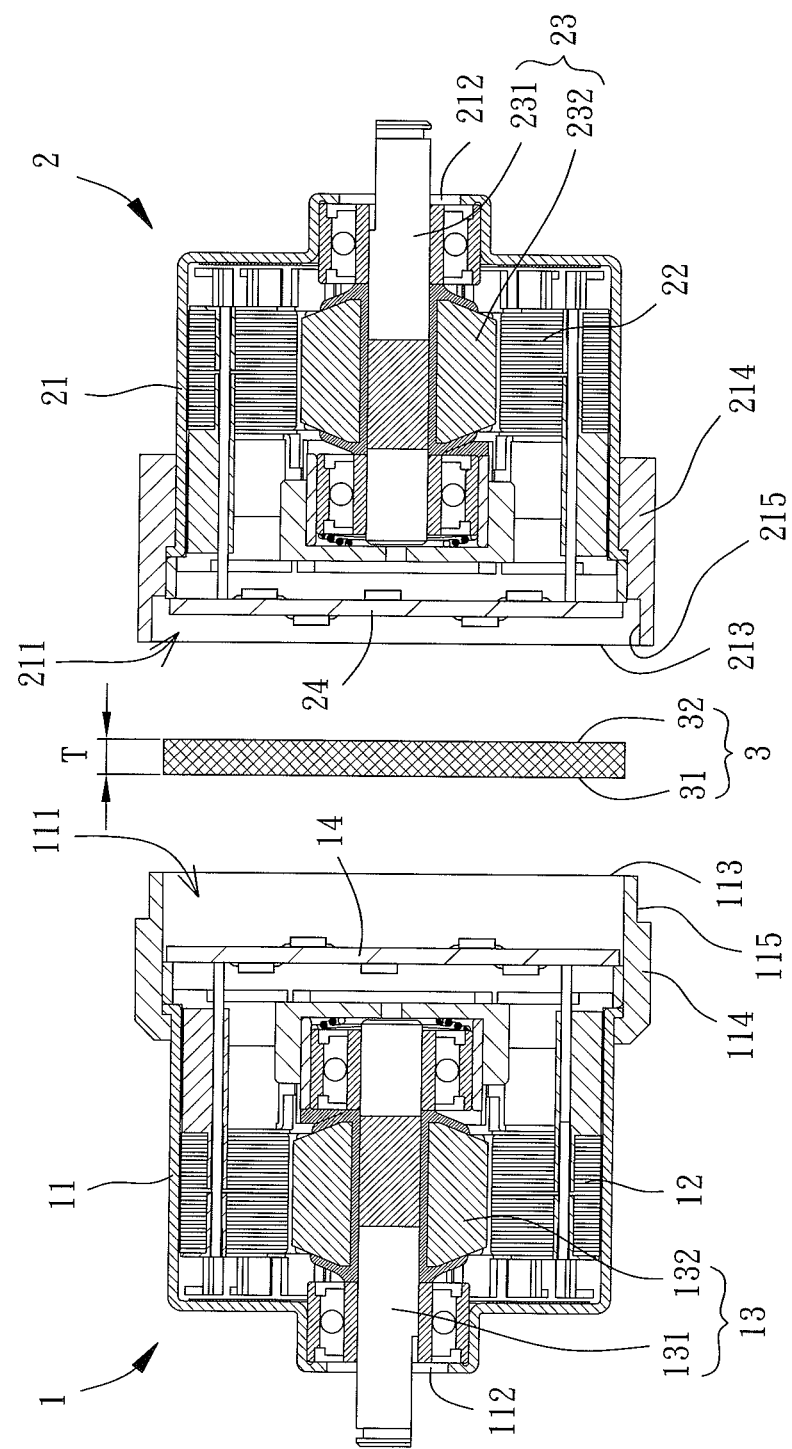
FIG. 3 shows a side cross-sectional view of the series-connected motor unit before assembly, according to the first embodiment of the invention.

Referring to FIGS. 2 and 3, a series-connected motor unit including a first motor 1, a second motor 2 and a separation member 3 is shown according to a first embodiment of the invention. The first motor 1 and the second motor 2 can be assembled together. The separation member 3 is disposed between the first motor 1 and the second motor 2 to prevent motor vibration generated during operation of the first motor 1 and the second motor 2 from traveling between the first motor 1 and the second motor 2 for a better vibration-proof effect.

The first motor 1 includes a first housing 11, a first stator 12, a first rotor 13 and a first circuit board 14. The first housing 11 is hollow and has a first compartment 111, a first axial hole 112 and a first assembling opening 113.

The first stator 12 may be a coil unit disposed in the first compartment 111.

The first rotor 13 is rotatably disposed in the first compartment 111 and has a first shaft 131 and a first permanent magnet 132. The first permanent magnet 132 is fixed at the first shaft 131 and opposing to the coil unit of the first stator 12. The first shaft 131 has one end extending out of the first housing 11 via the first axial hole 112 for coupling with a rotation member.

The first circuit board 14 is a printed circuit board (PCB) and has a plurality of electronic components such as driving circuits, transistors or passive components. The first circuit board 14 is disposed at a location adjacent to the first assembling opening 113 in the first compartment 111. The first circuit board 14 is electrically connected to the coil unit of the first stator 12. In this arrangement, the first circuit board 14 may drive the first rotor 13 to rotate.

The second motor 2 has similar structures and components as the first motor 1, such as a second housing 21, a second compartment 211, a second axial hole 212, a second assembling opening 213, a second stator 22, a second rotor 23, a second shaft 231, a second permanent magnet 232 and a second circuit board 24. The structures and components of the second motor 2 are coupled together in the same way as the first motor 1, so they are not described herein again.

The separation member 3 is made of resilient insulation material, such as rubber, Styrofoam, acrylic resin, silica gel or other silica gel compounded materials. The separation member 3 is preferably a thick slice having a thickness T, and has a first face 31 and a second face 32 opposite to the first face 31.

Figure 4:
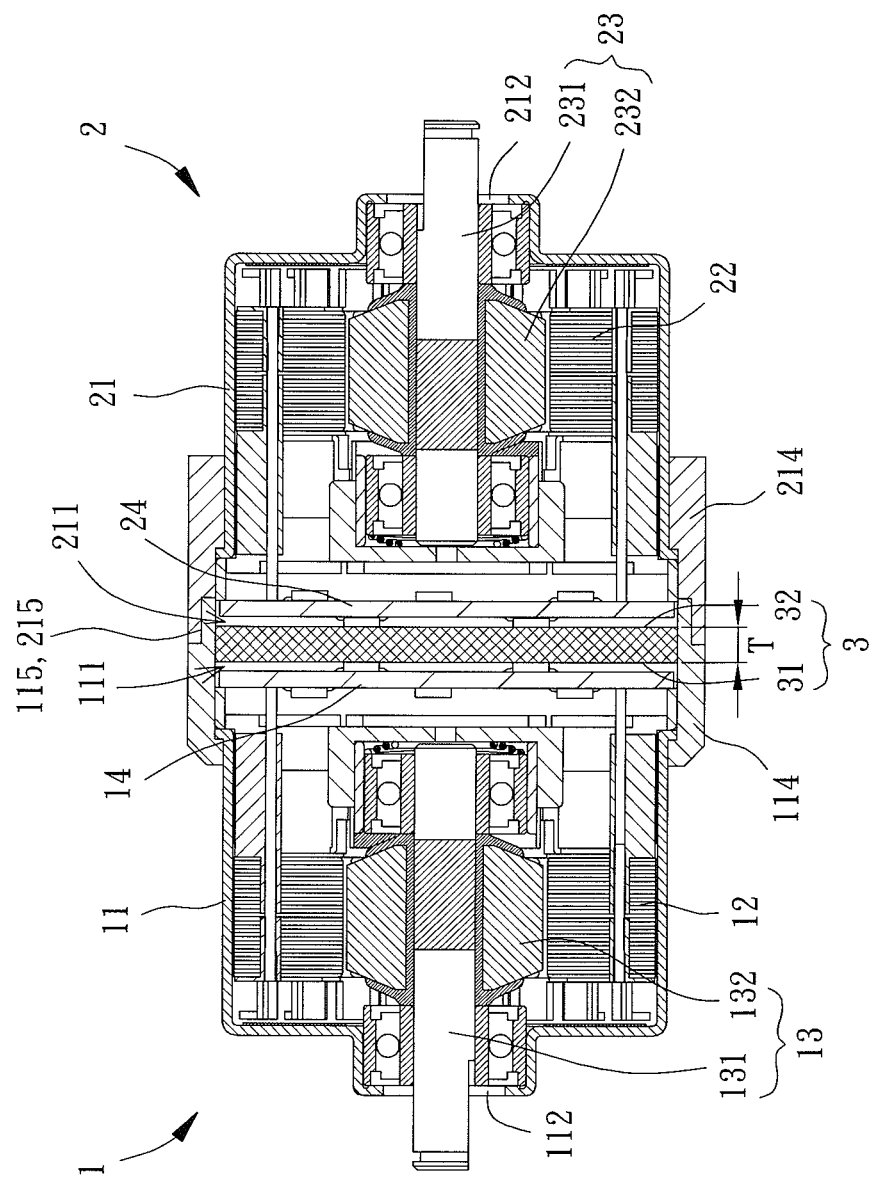
FIG. 4 shows a side cross-sectional view of the series-connected motor unit after assembly, according to the first embodiment of the invention.

Referring to FIGS. 3 and 4, the first assembling opening 113 of the first motor 1 is aligned with the second assembling opening 213 of the second motor 2 during assembly of the series-connected motor unit. The first housing 11 of the first motor 1 can be coupled with the second housing 21 of the second motor 2 by ways of adhesion, clipping or screwing. The separation member 3 is disposed between the first circuit board 14 and the second circuit board 24, with the first face 31 of the separation member 3 abutting against the first circuit board 14 and the second face 32 of the separation member 3 abutting against the second circuit board 24.

Furthermore, the first housing 11 of the first motor 1 may have a first coupling portion 114, and the second housing 21 of the second motor 2 may have a second coupling portion 214. The coupling portions 114 and 214 may be coupled together by ways of adhesion, clipping or screwing. In this embodiment, the first coupling portion 114 is in the form of a ring surrounding and encasing a portion of the first housing 11 adjacent to the first assembling opening 113. Similarly, the second coupling portion 214 is in the form of a ring surrounding and encasing a portion of the second housing 21 adjacent to the second assembling opening 213. The first coupling portion 114 has an outer circumferential edge 115, whereas the second coupling portion 214 has an inner circumferential edge 215. By coupling the outer circumferential edge 115 with the inner circumferential edge 215, the housings 11 and 21 can be coupled together via the coupling portions 114 and 214.

Since the separation member 3 has larger contact areas with the first circuit board 14 and the second circuit board 24 via the first face 31 and second face 32, the separation member 3 not only can separate the first circuit board 14 from the second circuit board 24 to prevent undesired electrical connection therebetween, but also can block and relieve motor vibration that travels between the first circuit board 14 and the second circuit board 24. Therefore, larger vibration and noise are avoided to reduce damage of the series-connected motor unit and to prolong the service life of the series-connected motor unit.

Moreover, since the first circuit board 14 and the second circuit board 24 have uneven surfaces due to electronic components or soldering points arranged thereon, the separation member 3 may be made of resilient material. As such, when the first face 31 and the second face 32 of the separation member 3 respectively abut against the first circuit board 14 and the second circuit board 24, the first face 31 and the second face 32 of the separation member 3 may be able to deform in any way to conform to the uneven surfaces of the first circuit board 14 and the second circuit board 24. Thus, close contacts between the separation member 3 and the first circuit board 14, and between the separation member 3 and the second circuit board 24, are provided. This achieves better isolation and vibration-proof effects for the series-connected motor unit. Moreover, based on the resilience of the separation member 3, the separation member 3 may apply a moderate abutting pressure to the first circuit board 14 and the second circuit board 24. This not only avoids gaps from forming between the separation member 3 and the first circuit board 14, and between the separation member 3 and the second circuit board 24, but also prevents the separation member 3 from over-abutting the first circuit board 14 and the second circuit board 24.

Figure 5:
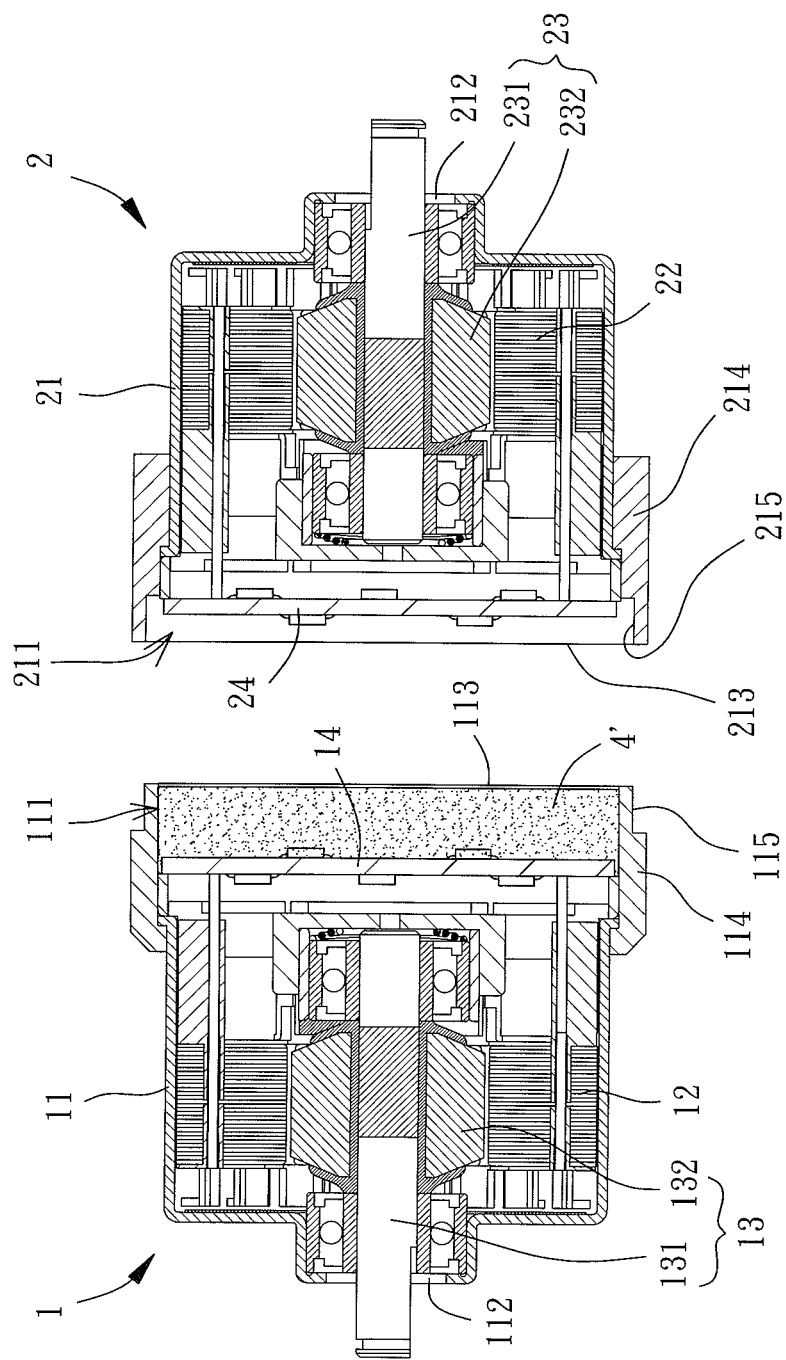
FIG. 5 shows a side cross-sectional view of a series-connected motor unit before assembly, according to a second embodiment of the invention.
Figure 6:
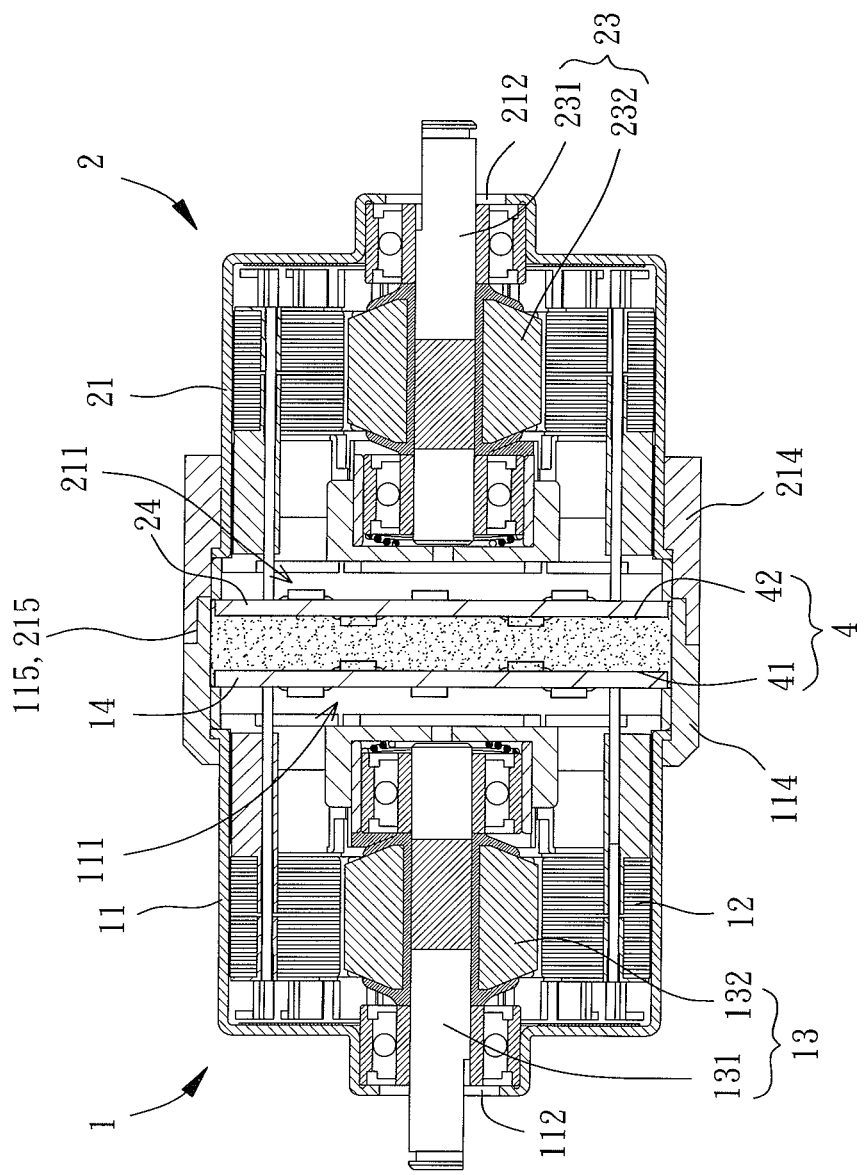
FIG. 6 shows a side cross-sectional view of the series-connected motor unit after assembly, according to the second embodiment of the invention.

Referring to FIGS. 5 and 6, a series-connected motor unit including a first motor 1, a second motor 2 and a separation member 4 is shown according to a second embodiment of the invention. The first motor 1 and the second motor 2 in the second embodiment are completely identical to those of the first embodiment, so they are not described herein again.

The separation member 4 in the second embodiment is a non-solid gel 4' filled between the first circuit board 14 and the second circuit board 24. The non-solid gel 4' may be a rubber, a Styrofoam, an acrylic resin, a silica gel or other silica gel compounded materials. In addition, the non-solid gel 4' will become the separation member 4 after solidification.

The non-solid gel 4' is filled in the first compartment 111 of the first motor 1 or the second compartment 211 of the second motor 2. In this embodiment, the non-solid gel 4' is filled in the first compartment 111 of the first motor 1 for illustration purposes. In this case, the face of the first circuit board 14 that faces the first assembling opening 113 is completely covered with the non-solid gel 4'. Then, the non-solid gel 4' will also attach to the face of the second circuit board 24 that faces the second assembling opening 213 when the first motor 1 and the second motor 2 are assembled together. As such, the non-solid gel 4' will become the separation member 4 between the first circuit board 14 and the second circuit board 24 after the non-solid gel 4' solidifies. Thus, the separation member 4 will also form a first face 41 and a second face 42 opposite to the first face 41, with the first face 41 abutting against the first circuit board 14 and the second face 42 abutting against the second circuit board 24.

Figure 7:
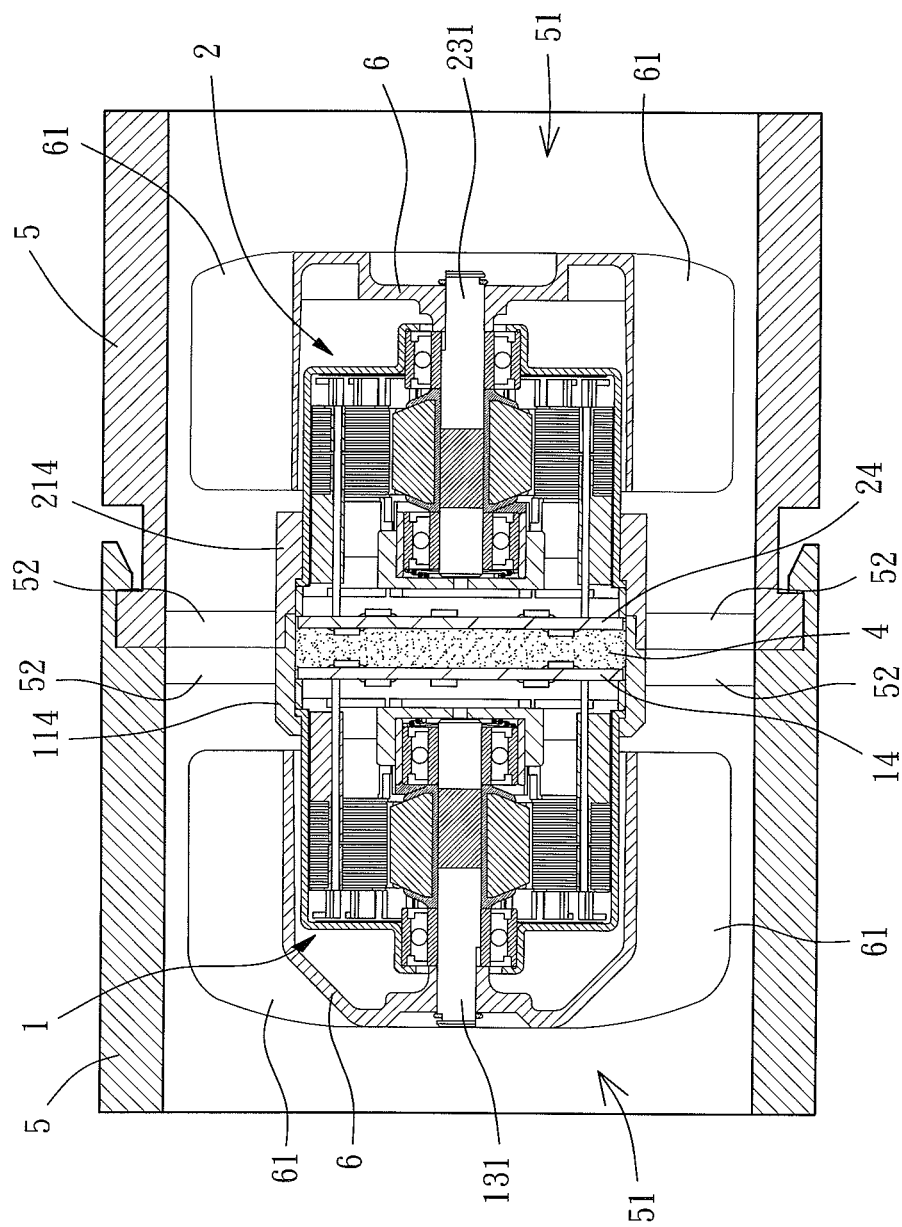
FIG. 7 shows a side cross-sectional view of a fan utilizing the series-connected motor of the second embodiment of the invention.

Referring to FIG. 7, the series-connected motor unit may be combined with two frames 5 and two rotation members 6 to form a fan having series-connected motors. Each frame 5 includes an airway 51. The first motor 1 and the second motor 2 are disposed in the airways 51 of the two frames 5, respectively. A plurality of ribs 52 is preferably used to connect the first coupling portion 114 to an inner circumferential wall of one frame 5, and to connect the second coupling portion 214 to an inner circumferential wall of the other frame 5. The two rotation members 6 are coupled to the shafts 131 and 231, respectively. Each rotation member 6 has a plurality of vanes 61 on an outer circumferential face thereof. Based on this, when the first motor 1 drives one rotation member 6 to rotate, the vanes 61 can draw the external air to pass through the fan via two sides of the airway 51. Similarly, when the second motor 2 drives the other rotation member 6 to rotate, the vanes 61 can draw the external air to pass through the fan via two sides of the other airway 51.

When the two frames 5 are assembled in series, the separation member 4 is disposed between the first circuit board 14 and the second circuit board 24 to block and relieve motor vibration that travels between the first circuit board 14 and the second circuit board 24.

As described above, since the first faces 31, 41 and the second faces 32, 42 of the separation members 3, 4 have larger contact areas with the first circuit board 14 and the second circuit board 24, as well as since the separation members 3, 4 are made of resilient insulation material, the separation members 3, 4 not only can separate the first circuit board 14 from the second circuit board 24 to prevent undesired electrical connection therebetween, but also can block and relieve motor vibration that travels between the first circuit board 14 and the second circuit board 24. Therefore, damage of the series-connected motor unit is reduced, and longer service life of the series-connected motor unit is attained.

The separation members 3, 4 of the invention are able to deform in a flexible way to conform to the uneven surfaces of the first circuit board 14 and the second circuit board 24. This not only enhances the contacts between the separation members 3, 4 and the first circuit board 14, and between the separation members 3, 4 and the second circuit board 24, but also applies a moderate abutting pressure to the first circuit board 14 and the second circuit board 24. As such, gaps between the separation members 3, 4 and the first circuit board 14, and between the separation members 3, 4 and the second circuit board 24, are avoided. Also, the separation members 3, 4 are prevented from over-abutting the first circuit board 14 and the second circuit board 24. Moreover, the separation members 3, 4 do not require high sophistication during manufacturing, which makes the manufacturing process easier.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A series-connected motor unit comprising:
   first and second circuit boards;
   a first motor having a first housing, with the first circuit board electrically connected to the first motor;
   a second motor, with the second circuit board electrically connected to the second motor, with the first and second circuit boards located intermediate the first and second motors; and
   a separation member having a first face and a second face opposite to the first face, wherein the first face abuts against the first circuit board, the second face abuts against the second circuit board, and the first circuit board, the second circuit board and the separation member are entirely received in the first housing, with the first circuit board located intermediate the first motor and the separation member, with the separation member located intermediate the first and second circuit boards and formed of material ensuring motor vibration traveling between the first and second circuit boards is relieved.

2. The series-connected motor unit as claimed in claim 1, wherein the separation member is a resilient insulation material.

3. The series-connected motor unit as claimed in claim 1, wherein the first motor has a first stator and a first rotor, the first housing of the first motor has a first compartment and a first assembling hole, the first stator is disposed in the first compartment, the first rotor is rotatably disposed in the first compartment, the first circuit board is disposed at a location adjacent to the first assembling hole in the first compartment, the second motor has a second housing, a second stator and a second rotor, the second housing has a second compartment and a second assembling hole, the second stator is disposed in the second compartment, the second rotor is rotatably disposed in the second compartment, and the second circuit board is disposed at a location adjacent to the second assembling hole in the second compartment.

4. The series-connected motor unit as claimed in claim 3, wherein the first assembling hole is aligned with the second assembling hole.

5. The series-connected motor unit as claimed in claim 3, wherein the first housing has a first coupling portion and the second housing has a second coupling portion coupled with the first coupling portion, with the first and second circuit boards and the separation member entirely received in the first coupling portion.

6. The series-connected motor unit as claimed in claim 5, wherein the first coupling portion is in the form of a ring surrounding and encasing a portion of the first housing adjacent to the first assembling hole, the second coupling portion is in the form of a ring surrounding and encasing a portion of the second housing adjacent to the second assembling hole, the first coupling portion has an outer circumferential edge, and the second coupling portion has an inner circumferential edge abutting and coupled with the outer circumferential edge.

7. The series-connected motor unit as claimed in claim 1, wherein the separation member is a gel selected from rubber, styrofoam, acrylic resin, silica or other silica compound materials.

8. A fan having a series-connected motor unit, comprising:
   first and second circuit boards;
   two frames, each having an airway;
   the series-connected motor unit having a first motor, a second motor and a separation member, with the first circuit board electrically connected to the first motor, with the second circuit board electrically connected to the second motor, with the first and second circuit boards located intermediate the first and second motors, wherein the first and second motors are respectively disposed in the two airways of the two frames, the first motor has a first housing, the separation member has a first face and a second face opposite to the first face, the first face abuts against the first circuit board, the second face abuts against the second circuit board, and the first circuit board, the second circuit board and the separation member are entirely received in the first housing, with the first circuit board located intermediate the first motor and the separation member, with the separation member located intermediate the first and second circuit boards and formed of material ensuring motor vibration traveling between the first and second circuit boards is relieved; and two rotation members respectively disposed in the two airways of the two frames, wherein the first and second motors respectively drive the two rotation members to rotate, and each of the two rotation members has a plurality of vanes on an outer circumferential face thereof.

9. The fan having the series-connected motor unit as claimed in claim 8, wherein the separation member is a resilient insulation material.

10. The fan having the series-connected motor unit as claimed in claim 8, wherein the first motor has a first stator and a first rotor, the first housing of the first motor has a first compartment, a first axial hole and a first assembling hole, the first stator is disposed in the first compartment, the first rotor is rotatably disposed in the first compartment and has a first shaft extending out of the first axial hole, the first circuit board is disposed at a location adjacent to the first assembling hole in the first compartment, the second motor has a second housing, a second stator and a second rotor, the second housing has a second compartment, a second axial hole and a second assembling hole, the second stator is disposed in the second compartment, the second rotor is rotatably disposed in the second compartment and has a second shaft extending out of the second axial hole, and the second circuit board is disposed at a location adjacent to the second assembling hole in the second compartment.

11. The fan having the series-connected motor unit as claimed in claim 10, wherein the two rotation members are coupled with the first and second shafts, respectively.

12. The fan having the series-connected motor unit as claimed in claim 10, wherein the first assembling hole is aligned with the second assembling hole.

13. The fan having the series-connected motor unit as claimed in claim 10, wherein the first housing has a first coupling portion, the second housing has a second coupling portion, and a plurality of ribs connects the first coupling portion to an inner circumferential wall of one of the two frames, and connects the second coupling portion to an inner circumferential wall of the other of the two frames, with the first and second circuit boards and the separation member entirely received in the first coupling portion.

14. The fan having the series-connected motor unit as claimed in claim 8, wherein the separation member is a gel selected from rubber, styrofoam, acrylic resin, silica or other silica compound materials.

* * * * *